(12) United States Patent
Sastinsky

(10) Patent No.: US 12,468,367 B2
(45) Date of Patent: *Nov. 11, 2025

(54) SYSTEM FOR FACILITATING EDGE ANALYTICS FOR POWER SYSTEMS

(71) Applicant: BatteryCheck LLC, Lewes, DE (US)

(72) Inventor: Michal Sastinsky, Bratislava (SK)

(73) Assignee: BatteryCheck LLC, Lewes, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/661,140

(22) Filed: May 10, 2024

(65) Prior Publication Data

US 2024/0370073 A1    Nov. 7, 2024

Related U.S. Application Data

(63) Continuation of application No. 17/881,495, filed on Aug. 4, 2022, now Pat. No. 11,989,073.

(60) Provisional application No. 63/229,889, filed on Aug. 5, 2021.

(51) Int. Cl.
*G06F 1/30*    (2006.01)

(52) U.S. Cl.
CPC .................................. *G06F 1/30* (2013.01)

(58) Field of Classification Search
CPC ........................................... G06F 1/30
See application file for complete search history.

(56) References Cited

U.S. PATENT DOCUMENTS

| | | | | |
|---|---|---|---|---|
| 8,650,416 | B2 * | 2/2014 | Noel | H04L 12/40039 |
| | | | | 713/320 |
| 2018/0143257 | A1 | 5/2018 | Garcia et al. | |
| 2020/0269722 | A1 * | 8/2020 | Aykol | G05B 13/0265 |
| 2022/0114373 | A1 * | 4/2022 | Westerheide | G06F 18/25 |

OTHER PUBLICATIONS

European Patent Office, Extended European Search Report, Application No. 22853970.6, dated Jul. 29, 2025, 8pages.

* cited by examiner

*Primary Examiner* — Zahid Choudhury
(74) *Attorney, Agent, or Firm* — Mahamedi IP Law LLP

(57) ABSTRACT

A network-isolated computer system executes a set of containers to perform local power system monitoring and optimization techniques (edge analytics) for a network-isolated facility or vehicle.

20 Claims, 5 Drawing Sheets

SYSTEM FOR FACILITATING EDGE ANALYTICS FOR POWER SYSTEMS

CROSS-REFERENCE TO RELATED APPLICATIONS

This application is a Continuation of U.S. patent application Ser. No. 17/881,495, filed on Aug. 4, 2022; which claims the benefit of priority to U.S. Provisional Patent Application No. 63/229,889, filed on Aug. 5, 2021, the aforementioned applications being hereby incorporated by reference in their respective entireties.

TECHNICAL FIELD

Examples described herein relate generally to the facilitation of edge analytics for power system monitoring and performance optimization.

BACKGROUND

Network-isolated computer systems are typically used by design (e.g., to prevent hacking) or due to physical isolation from network infrastructure (e.g., in remote locations) making, for example, system monitoring or updates impossible to perform over-the-air. Accordingly, upgrading such computer systems with newer hardware or software updates to, for example, optimize system performance typically must be performed on-site or via a temporary secure network connection.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
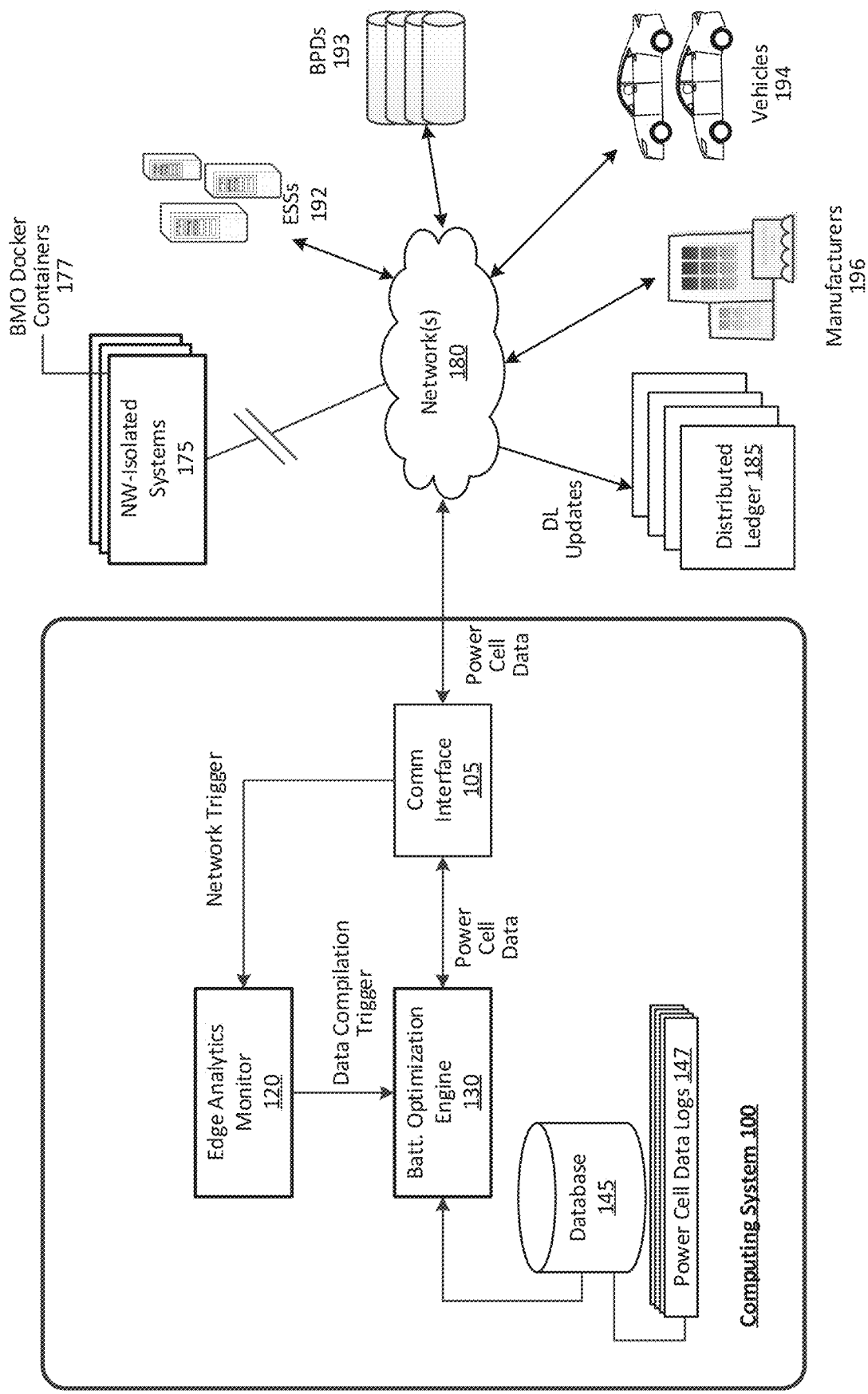
FIG. 1 is a block diagram illustrating computing system implementing power cell monitoring and optimization, in accordance with examples described herein.

A system for facilitating edge analytics for power systems of network-isolated vehicles or facilities is described herein. In various implementations, the system can operate through remote, network-based monitoring and optimization of power systems (e.g., battery packs or modules of battery-powered devices). Detailed description of such remote, network-based power system monitoring, optimization, and determination of approximate battery end-of-life (ABEL) is described in U.S. Patent Publication No. 2020/0055421, which is hereby incorporated by reference in its entirety.

Described herein are systems, methods, and non-transitory computer readable media providing such functionality locally through execution of containers (e.g., via the Docker platform) to perform edge analytics and optimizations of network-isolation power systems.

According to examples described herein, the various applications that implement the remote monitoring and power system optimization functions described herein can be containerized (e.g., via a Docker Engine) so that such functions can be performed locally on network-isolated systems (e.g., on container ships, oil tankers, or military vessels, or in highly-secure and sensitive facilities, such as power generation stations or nuclear facilities). Thus, through execution of the container(s), a network-isolated computer system can implement power system monitoring and optimization to track power system data from batteries, battery-powered devices, energy storage systems, energy production systems, Internet of Things (IoT) devices and sensors, and the like. In various implementations, the system can include a database comprising data logs or profiles comprising battery information from each power cell or power cell type that the system monitors. According to examples provided herein, the system can receive battery data from the battery-powered systems periodically or dynamically and present an updated graphical user interface that provides the current state and any number of recommendations to optimize the power systems of the network-isolated facility or vehicle. In further examples, the system can receive telemetric data from one or more additional sensors of the battery-power systems, such as accelerometers, inertial measurement units, gyroscopic sensors, magnetometers, temperature sensors, pressure sensors, infrared and other proximity sensors, cameras or other image capturing devices, and the like.

In performing the power system monitoring, optimization, and present recommendation, the network-isolated system can analyze the battery data and telemetric data collected from each power system based on information corresponding to the chemistry parameters of the power system, the entity name of the producer, the type of battery cell chemistry, time of production (e.g., day, week, month, and/or year), optimal charging and discharging temperatures, stated or estimated calendar life, estimated cycles, c-rate (e.g., a rate at which the battery is discharged relative to its maximum capacity), cell voltage (e.g., minimum and maximum voltages), energy density, depth of discharge, and any other available data from the power cell and power cell producer.

The system can further perform power system monitoring, optimization, and present recommendations using data provided from a producer and/or integrator that developed or tested the power system. These additional data can include nominal capacity of the power cell solution, usable capacity of the power cell solution, data about the setup of the battery management system (BMS) of the power cell (e.g., limitations on charging speed, discharging, etc.), general parameters about power cells and their performance for each particular battery chemistry (e.g., industry standards), and the like.

In certain aspects, the system can further utilize time series data (e.g., atomic and/or aggregated data from the BMS of the power system). For example, the system can access data from the BMS of the power system, which can include current limits (e.g., minimum and maximum currents calculated by the BMS for charge and discharge directions), the current read from a direct current bus (e.g., current minimums, maximums, and averages), stack voltage of the power cell(s) (e.g., voltage minimums, maximums, and averages), cell voltage statistics (e.g., minimum, maximums, and average cell voltages of all power cells), cell voltage locations (e.g., cell number) for minimum and maximum measurements, temperature statistics (e.g., minimum, maximum, and average temperatures measured), temperature measurement locations (e.g., cell number for the minimum and maximum temperature measurements), contactor states, and the like. The system can further utilize data corresponding to, for example, state of charge, state of discharge, state of health, and/or other data that may be calculated by the BMS of the power system.

The data from the BMSs of the power systems can be accessed or otherwise received using a controller area network (CAN) communication protocol, ModBus communication protocol (like ModBus TCP or any other) or any other communication protocol. For example, the network-isolated computing system executing the container(s) can operate as a local computing system in wired or local wireless communication with the BMS of a power cell stack (e.g., of individual containers of a container ship).

For vessel implementations, the computer system of the vessel may encounter network access when, for example, arriving in ports. It is contemplated that satellite network access can be provided globally via geostationary satellite internet constellations. However, network latency issues may prevent network access for lower priority communications, such as for power system data streaming to monitor and optimize power system usage on-board the vessels. As such, "a network-isolated system" can comprise a system having no network connectivity to external networks (e.g., the Internet) or may have prohibitively high network latency for cloud computing communications to be practical or effective. In one implementation, individual shipping containers on shipping vessels may require precise climate control to prevent the spoiling of perishable products or otherwise prevent damage to temperature and/or humidity sensitive goods. It has been widely observed that when climate control systems of shipping containers fail or experience faults, the goods housed within may require extensive repairs or may even be disposed of, resulting in massive waste of not only the ruined goods within, but also the cultivating process or manufacturing process and the loading and fuel for transporting the spoiled shipping container. Credible estimates of food waste alone can comprise between thirty and forty percent of the entire food supply, with transportation amounting to a significant proportion of the waste.

Among other benefits, examples described herein achieve a technical effect of optimizing power system usage through power system data analytics and/or machine learning techniques to determine reliable and accurate power cell usage recommendations and settings to maximize power cell life while minimizing long term wear and damage to the power systems.

As provided herein, a "calendar life" of a power cell comprises the amount of time a power cell will last when used within normal boundaries. Such calendar life may also be referred to as nameplate calendar life, which is chemistry specific. For example, Lithium Titanate Oxide batteries have a calendar life of fifteen to twenty years, whereas Lithium Graphite NMC batteries have a calendar life of ten to twelve years.

Numerous examples described herein refer to a "power cell," which comprises any combination of batteries, battery packs, battery cells, electrochemical devices, ultracapacitors, fuel cells, solar cells (e.g., photovoltaic cells, solar water heaters, thermogalvanic cells, solar air heaters, solar thermal collectors, etc.), battery racks or battery strings, battery modules, battery containers, and other energy storage and/or deployment systems and other energy producing systems (e.g., piezoelectric sensors or devices, energy harvesting devices, crystals, etc.).

As further provided herein, "end-of-life," "real end-of-life," "real end life," refers to the state of charge and/or state of health of a power cell being at zero percent. For primary life batteries, common practice is deemed that between 60%-80% of capacity equals the end of the primary life or simply end-of-life of the power cell. A "second life battery" comprise a power cell that has reached its primary end of life (e.g., 80% capacity for vehicle batteries and batteries/energy storage systems), but still has usable capacity for secondary use. The "approximated battery end of life" (ABEL) of a second life battery, refers to an estimated or calculated time between the primary end of life and the real end-of-life, and is the focus of the present disclosure.

As used herein, "distributed ledger" or "distributed ledger technology" refers to replicated, shared, and/or synchronized data spread across multiple sites. In certain aspects, the distributed ledger can comprise a central storage combined with independent remote storage resources. In variations, the distributed ledger can comprise a peer-to-peer network of storage devices, where each device replicates and stores an identical copy of the ledger (e.g., power cell logs) and updates independently. Examples of distributed ledgers can include a blockchain, various types of acyclic graphs (e.g., blockDAG or TDAG), and the like.

As used herein, a computing device refers to devices corresponding to servers, desktop computers, cellular devices or smartphones, personal digital assistants (PDAs), laptop computers, virtual reality (VR) or augmented reality (AR) headsets, tablet devices, etc., that can provide network connectivity and processing resources for communicating with the system over a network. A computing device can also correspond to custom hardware, in-vehicle devices, or on-board computers, such as those provided in connection with battery management systems of vehicles, energy storage systems, and the like. The computing device can also operate a designated application configured to communicate with a network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular phones or smartphones, personal digital assistants (e.g., PDAs), laptop computers, VR or AR devices, network equipment (e.g., routers), and/or tablet computers. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a non-transitory computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, flash memory (such as carried on smartphones, multifunctional devices, or tablets), and/or magnetic memory. Computers, terminals, network-enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 is a block diagram illustrating an example computing system 100 implementing power cell monitoring and optimization, according to various examples. The computing system 100 can include a communications interface 105 that receives power cell data from the battery and/or power systems of any one or more of various sources, such as energy storage systems 192, battery powered devices 193, vehicles 194, battery manufacturers 196, or any other solution which uses a battery/power cell as a primary or secondary source of electric energy. Each power cell, battery stack, or energy storage system 192 can be managed by a battery management system which monitors batteries (e.g., voltage, temperature, current, etc.) and provide and calculate useful data about the status of the batteries (e.g., state of charge, state of health, etc.).

The battery management system can also control and manage charging and discharging of the power cells, influencing the battery performance and capacity during the life of the power cell, protecting the battery from degradation, and maintaining the battery within a certain set of safety parameters. As provided herein, the battery-powered devices 193 can utilize a battery/power cell as a primary or secondary source of electric energy (e.g., electric vehicle, battery electric vehicle, hybrid electric vehicle, electric bus, electric watercraft, electric airplane, satellites, scooter, train, forklift, energy storage systems, home storage, industrial storage, photovoltaic connected storage, grid connected storage, power station, mobile phone, mobile device, IoT device(s), power tool, drone, leaf blower, and the like).

As described herein, the power cell data can comprise nameplate information of the power cell, such as the chemistry parameters of the power cell, the entity name of the producer, the type of battery cell chemistry, time of production, temperature tolerances, stated or estimated calendar life, estimated cycles, c-rate, cell voltage ratings, energy density, depth of discharge, and any other available data from the power cell manufacturer 196. As further described herein, the power cell data can further include nominal capacity of the power cell solution (e.g., total capacity), usable capacity of the power cell solution (e.g., permitted capacity), data corresponding to the setup of the battery management system of the power cell solution (e.g., limitations on charging speed, discharging, etc.), general parameters about power cells and their performance for each particular battery chemistry (e.g., industry standards), and the like.

In certain aspects, the power cell data can further include time series data (e.g., atomic and/or aggregated data from the BMS of the power cell). such as current limits, the current read from a direct current bus, stack voltage of the power cell(s), cell voltage statistics, cell voltage locations, temperature statistics, temperature measurement locations, contactor states, and the like. The power cell data can further indicate a battery management system safety factor, and fault data of each power cell. In certain examples, the power cell data can further comprise information corresponding to the deployment of the power cell(s), such as the usage of the power cell, distance traveled (e.g., mileage from an odometer), and the end-user of the power cell (e.g., electric vehicle, battery electric vehicle, hybrid electric vehicle, electric bus, electric watercraft, electric airplane, scooter, train, forklift, mobile phone, mobile device, IoT device, power tool, drone, energy storage systems, home storage, industrial storage, photovoltaic connected, grid connected storage, power station, and the like). In some aspects, the power cell data can also indicate the battery mode (e.g., island mode), frequency regulation, and/or time shift.

In certain implementations, the communication interface 105 can receive additional data from the battery-powered devices 193 and/or vehicles 194. For example, the communications interface 105 can receive or otherwise assess sensor data from vehicle sensors or sensors from a battery powered device, such as diagnostic or telemetry sensors, an inertial measurement unit, positioning system, battery and/or energy storage system, and the like. Such data may also originate from the vehicle's on-board computers or memory, and can identify any faults, service requirements, current operability, and the like. In such examples, the computing system 100 can perform additional calculations with different results than ABEL, such as where power cell data is not needed as a primary or necessary source of data. For example, a vehicle manufacturer may provide data from other sensors of their vehicles, enabling the computing system 100 to calculate failures of certain spare parts or vehicle systems, and/or calculate predictive maintenance for additional components of the vehicle 194.

The power cell data can be accessed by the communication interface 105 using a controller area network (CAN) communication protocol, ModBus communication protocol (like ModBus TCP), or any other communication protocol (e.g., leveraging JavaScript Object Notation (JSON) or any other communication means). In variations, the power cell data can be accessed or received by the communication interface 105 over one or more networks 180 using any type of communications protocol (e.g., wireless or wired networks).

In various examples, the computing system 100 can store the power cell data in data logs 147 of a database 145. In some aspects, the database 145 can comprise a central storage facility for the data logs 147 (e.g., big data storage). In certain examples, the data logs 147 can associate each power cell with a unique identifier (e.g., a vehicle identification number of a vehicle in which the power cell is installed). In variations, the data logs 147 can associate each energy storage system 192, battery-powered device 193, vehicle 194, battery string, battery stack, or other end usage object in which more than one power cell is packaged, with a single unique identifier for managing the power cell data received from the power cells in the data logs 147.

In various aspects, the computing system 100 transmit the compiled power cell data and or the data logs 147 for each power cell or power cell package to a distributed ledger 185 (e.g., a blockchain) to ensure that the data and/or data logs 147 are secure and completely reliable. As provided herein, the distributed ledger 185 can comprise a peer-to-peer network of nodes or computing systems executing one or more consensus computer models or algorithms to ensure that the data logs 147 are replicated across the nodes.

According to examples described herein, the computing system 100 can further include battery optimization engine 130. In some aspects, the battery optimization engine 130 can execute one or more machine learning models to determine ABELs for power cells, and to continuously improve the accuracy of these calculations. It is contemplated that the EoL machine learning techniques and/or artificial intelligence techniques performed by the optimization engine 130 (e.g., through the use of convolutional neural networks, mixed-linear and/or non-linear recursive analysis, etc.) can determine an ABEL or remaining useful life (RUL) for each power cell or power cell package (e.g., of a vehicle 194) based on the historical power cell data recorded in the data logs 147. For example, each iteration of data collection can trigger the battery optimization engine 130 to determine a new or updated ABEL or RUL for a given power cell of an ESS 192, battery-powered device 193, electric vehicle 194, and the like. As another example, the battery optimization engine 130 can be triggered to determine an ABEL or RUL of a particular power cell or energy storage system 192 upon request from an entity that uses, views, or processes output of the computing system 100.

The battery optimization engine 130 can determine ABELs or RULs for a particular power cell given the current data in the data log 147 of that power cell. In further examples, the battery optimization engine 130 can further ingest telemetric sensor data from battery powered devices 193, vehicles 194, and energy storage systems 192 and factor the telemetric sensor data into its calculations to determine, for example, false positive or false negative signals (e.g., a problem with a separate component or event as opposed to a battery). As described, the power cell data may be organized using a unique identifier for the power cell and timestamps indicating when the data were collected. Accordingly, battery optimization engine 130 can determine an ABEL or RUL for a battery given the entire historical record of the battery. The battery optimization engine 130 can also access or receive, as learning input, new power cell data periodically or dynamically received from the battery management systems, communication or processing interface, and/or IoT chips of the usage sources (e.g., energy storage systems 192, battery-powered devices 193, electric vehicles 194, power stations, etc.). The battery optimization engine 130 can utilize any newly received data to confirm or adjust previous ABEL or RUL calculations for a given power cell in order to continuously improve such calculations.

In certain examples, the battery optimization engine 130 can comprise computational resources executing a set of machine learning models or algorithms having a goal of accurate and reliable ABEL or RUL determinations. Such ABEL or RUL determination can be utilized by primary and or secondary power cell markets to promote the full usage of power cell capacity and significantly reducing and/or eventually eliminating waste. In providing accurate, unmanipulated and immutable ABEL reports or RUL reports to end users or customers—such as prospective used vehicle owners, current vehicle owners, second life battery assemblers, prospective used battery-powered device buyers, current owners of battery-powered devices 193, or other entities that may otherwise use, view or process the output of the computing system 100—the computing system 100 and distributed ledger 185 offers a technical solution to various technical problems existing in the field of secondary power cell use.

The ABEL reports or RUL reports provided by the battery optimization engine 130 can comprise ABEL or RUL calculations or determinations for individual power cells, which can be identified by their unique identifiers. The ABEL reports or RUL reports can further include additional data, such as a battery state of health certificate, which, in certain implementations, can comprise a ratio of the current rating of a battery with respect to nameplate rating as indicated by the battery's manufacturer 196, and/or a battery health grade indicating the current rating along with a guaranteed certificate of reliability. For example, when the state of health for a battery or battery-powered device 193 is 100% or "A+," the battery is performing in accordance with its nameplate rating. As another example, when the state of health for a battery or battery-powered device 193 is within 95% of its nameplate rating, the battery health grade can indicate an "A" rating.

For vehicle and battery-powered device implementations, the ABEL report or RUL report generated by the battery optimization engine 130 can include ABEL determinations for every power cell in the vehicle 194 or battery-powered device 193, or a collective ABEL or RUL for the entire battery pack of the vehicle 194 or battery-powered device 193. The ABEL report or RUL report of a vehicle 194 or battery-powered device 193 can further include information indicating a current age of the battery system, a number of charge/discharge cycles of the vehicle's battery system, and estimated number of charge/discharge cycles left, an estimated calendar life remaining for the battery system, the current mileage of the vehicle 194 or hourly usage of a battery-powered device 193, and the like. Along these lines, the ABEL report for any power cell can also include a current age of the power cell, a number of charge/discharge cycles of the power cell, an estimated number of charge/discharge cycles left, an estimated calendar life remaining for the power cell, a performance grade for the power cell, and the like. It is contemplated that such reports can be utilized to more accurately determine a current valuation of a vehicle 194 or battery-powered device 193 for both current owners and prospective buyer and largely eliminate the current need for speculative valuation.

In certain implementations, end users can access ABEL reports or RUL reports via a website or through a battery-check application executing on a computing device (e.g., via an application programming interface (API)). In certain examples, the end user can do so by entering a unique identifier of the power cell, or a vehicle identification number of a vehicle 194. In some implementations, the end user can access ABEL reports of power cells through a web portal, API, or other accessing means to connect with the computing system 100.

In further examples, the communication interface 105 can correspond to a single API or multiple APIs that enable communications with the computing system 100. Accordingly, the communications systems of the ESSs 192, BPDs 193, vehicles 194, manufacturers 196 (e.g., of individual power cells, power cell packs or strings, the vehicles 194, ESSs 192, BPDs 193), trusted third-party services (not shown), distributed ledger 185, and/or the user devices can transmit and/or receive data with the computing system 100 through an API of the computing system 100. Such data can include notifications and recommendations for enhancing battery performance, the power cell data, recommendations to repurpose or replace a power cell or power cell package, or ABEL requests and transmissions of ABEL reports, as described herein.

In various implementations, the battery optimization engine 130 can further communicate over the communication interface 105 with vehicle manufacturers, battery-powered device manufacturers, and/or power cell manufacturers (collectively "manufacturers 196") and/or battery management systems, IoT chips, or other communication or processing interfaces of energy storage systems 192, battery-powered devices 193, and vehicles 194 (or any other managed battery or power cell device).

In certain examples, the instructions executable by processing resources to implement the functions of the battery optimization engine 130 described herein can be containerized or packaged into standardized units or containers 177—with the multiple applications, features, or functions sharing a common operating system kernel. Such containerization eliminates any requirements for differing operating systems for individual applications, and can enable the applications that execute the functions of the battery optimization engine 130 to be performed locally and in an isolated manner without requiring network communications.

One particular advantageous application of the containers 177 that cause the functions of the battery optimization engine 130 is with network-isolated computer system 175, which may be isolated either by design or due to physical isolation from high bandwidth, low latency networks. One particular technical problem involved with low bandwidth, high latency networks for physically remote locations (e.g., geosynchronous satellite internet in the middle of an ocean or a remote land location) is an inability to stream data as well as the ubiquity of crowded networks that are limited in utility (e.g., reserved for high-priority communications).

Whether executed at the computing system 100 as a remote service, or locally on network-isolated systems 175 via execution of the battery monitoring and optimization containers 177, the battery optimization engine 130 can analyze the power cell data of power systems and determine an optimal set of settings of the batteries that power various devices, vehicles, or systems (e.g., climate control systems for shipping containers) in order to increase or otherwise improve ABEL or RUL and/or the overall performance of the batteries. For example, the battery optimization engine 130 can push certain data and/or commands back to, for example, the battery management systems of the power cells for reconfiguration.

In doing so, the battery optimization engine 130 can determine, based on the power cell data, whether power cells are being used optimally. Certain settings may be changed by the battery optimization engine 130 in order to, for example, prolong the life of a battery, reduce the probability of damage to the battery, and the like. In one example, the battery optimization engine 130 can receive additional contextual data from various sensors, such as weather or outdoor/ambient temperature information, traffic information, schedule information of an end user, location information from a positioning system, and the like. The battery optimization engine 130 can reconfigure the battery management systems of vehicles 194, battery powered devices 193, energy storage systems 192, or power systems to make the power cells run, deploy power, and/or recharge most optimally or efficiently given the current contextual conditions. For example, if a vehicle 194 operating in hot weather, the battery optimization engine 130 can cause the battery management system of the vehicle to be reconfigured for the hot weather (e.g., no fast charging permitted).

In certain examples, the battery optimization engine 130 can also act as a warning, notification, and or recommendation system. The ABEL or RUL of a given power cell can be calculated periodically. Based, at least in part, on these calculations, the battery optimization engine 130 can determine optimal battery settings for the power cell's battery management system, and can generate and present notifications and/or recommendations on a continuously updated graphical user interface. As described herein, the calculations may further take into account the telemetric data from additional sensors or a battery-powered device (e.g. indicating shocks, vibrations, etc.). For example, a surge in battery power or a sudden increase in temperature may be correlated to a component fault or failure, or an anomalous event occurring with the battery-powered device (e.g., a battery-powered drill getting stuck). Accordingly, the battery optimization engine 130 can identify the anomaly in the telemetric data, determine whether the anomaly affects the performance or life of the battery, and provide a notification or recommendation accordingly. Such notifications or recommendations can identify certain actions or practices for users that, if followed, would maximize the ABEL, RUL, and/or performance of their power systems (e.g., enhance battery life). As an example, the battery optimization engine 130 can present a notification to a monitoring technician that can suggest a certain action be performed.

For network-isolated systems 175, the notifications can be presented on a control and command panel, and can provide recommendations or suggestions to change the operational parameters of a particular power system that can correspond to an ideal state for the power system given current conditions, charge, etc. In further examples, the battery optimization engine 130 can monitor the power cell data in the power cell data logs 147 stored locally on the network-isolated system 175 According to examples described herein, the battery optimization engine 130 can monitor the battery usage information, including battery usage conditions and current rating (e.g., compared to original nameplate rating), etc., to determine if the battery usage is in accordance with a set of target (e.g., optimal for efficiency or throughput) performance metrics. Such optimal performance metrics can be battery-type specific, battery-chemistry specific, battery-powered device specific, location specific (e.g., given average temperatures or weather conditions), time-specific (e.g., given current temperature or weather conditions, or current season), or any combination of the foregoing.

In various implementations, each power system can be operable in a set of optimal performance ranges that can correspond to the deployment of power, charging, charging times, nature of usage, storage, and the like. The battery optimization engine 130 can identify when a particular power system operates or is otherwise used outside these set of optimal performance ranges. In response to this determination, the battery optimization engine 130 can display a recommendation on a graphical user interface indicating a set of suggestions that would result in a more optimal use of the power system (e.g., to prolong the ABEL and/or increase range, life, or performance of the power system).

It is contemplated that the recommendations triggered by a particular power system operating outside target (e.g., optimal or otherwise desired) ranges can be applied to both rechargeable power cells and single use power cells. Furthermore, the techniques described herein with regard to the recommendations for operational settings and/or adjustments, as well as replacement or repurposing recommendations can further be applied to direct-power sources, such as solar panels, solar cells, piezoelectric devices, and the like.

In certain examples, instead of sending recommendations, the battery optimization engine 130 can automatically transmit a set of commands directly to the power system to cause a management system of the power system to adjust one or more settings corresponding to charging, power deployment, cooling, heating, etc., in order to operate the battery within the set of optimal performance ranges (e.g., for the purpose of maximizing ABEL or RUL).

It is contemplated that the recommendations and/or direct adjustment controls implemented by the battery optimization engine 130 can by particular useful in certain applications where safety and/or convenience and efficiency are paramount. One particular application of the battery optimization engine 130 is for container ships where certain shipping containers are powered by climate control systems to maintain an ideal climate for the goods being transported therein. The systems may be powered by on-board electrical hook-ups or may be powered by battery-packs (e.g., as a backup power system).

The data from each power system of each shipping container can be transmitted to a central hub (e.g., an on-board computer system of the vessel). As described herein, each power system of each shipping container can be associated with a unique identifier and the battery optimization engine 130 can store the data with the unique identifier in local power cell data logs 147. The battery optimization engine 130 can periodically access the data for each power system of each shipping container to perform the functions described herein.

When the operational parameters for any particular power system crosses outside a threshold range, the battery optimization engine 130 can display a recommendation to an operator or technician on-board, or transmit a notification to a computing device of the operator. The operator may then change the batteries of the power system or replace the batteries of the power system with a backup. It is contemplated that this on-board monitoring can preempt scenarios in which power systems fail, causing the climate control systems of the sensitive shipping containers to shut down and potentially ruin the goods stored therein.

In certain example, the remote computing system 100 can include an edge analytics monitor 120, which can receive a network trigger indicating that a network-isolated system 175 has reliable, high bandwidth network access. For example, a container ship may be docked in a port and the computer system of the container ship may be linked to a low latency network of the port. Upon detected of the network trigger, the edge analytics monitor 120 of the computing system 100 can receive power cell data from the various power systems of the network-isolated system 175. In some aspects, the battery optimization engine 130 can record the power cell data, or a summary of the power cell data, of each power system with a unique identifier in the power cell data logs 147 and/or on the distributed ledger 185 to render the data immutable. Accordingly, when the power systems of the network-isolated system 175 (e.g., the container vessel) reach their respective ABELs, a secondary-life business may acquire the power systems for secondary life usage (e.g., for energy storage systems 192).

Network-Isolated System

Figure 2:
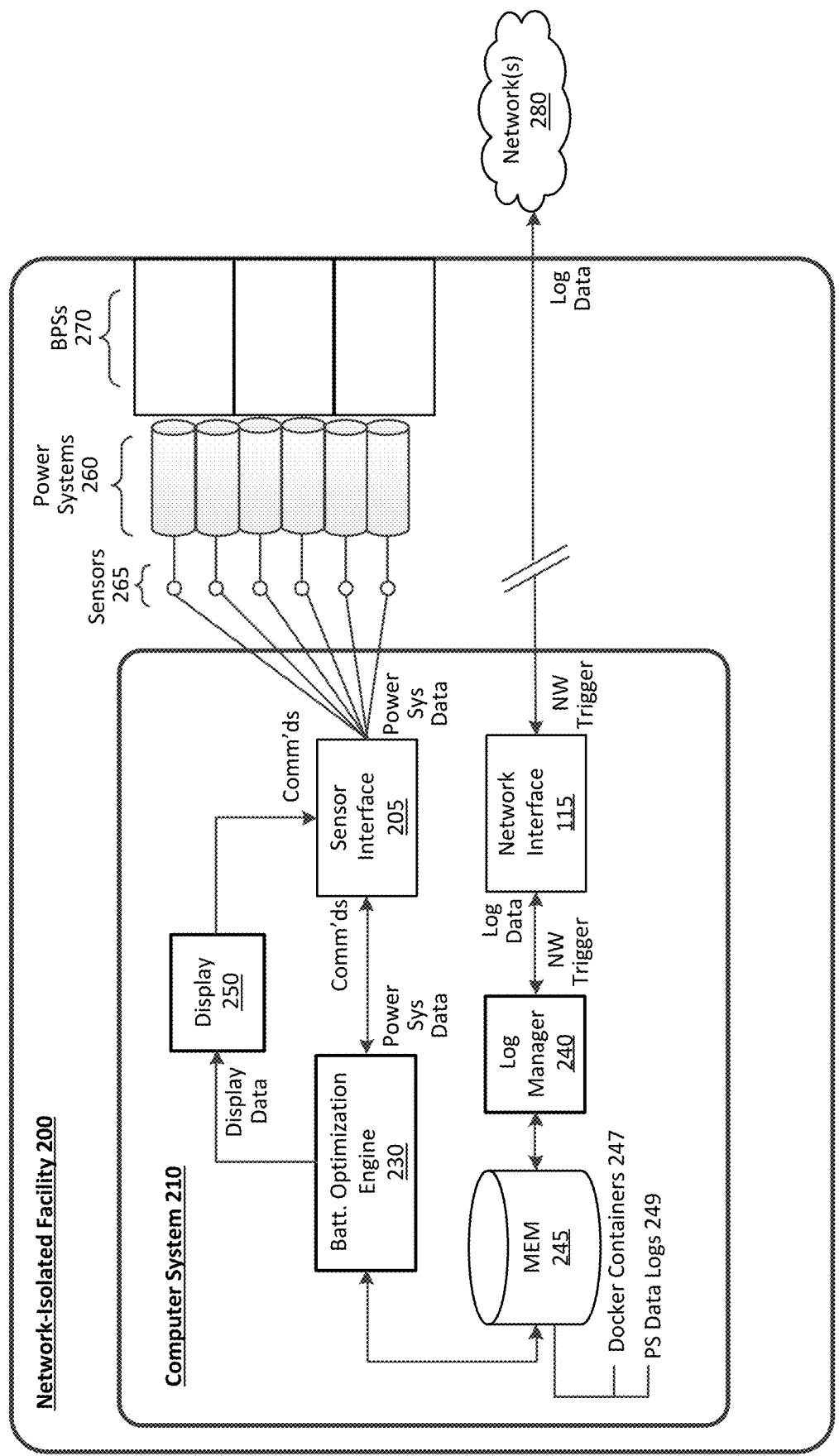
FIG. 2 is a block diagram illustrating a local computing system of a network-isolated facility or vehicle executing Docker containers for implementing local power system monitoring and optimization, according to examples described herein.

FIG. 2 is a block diagram illustrating a local computer system of a network-isolated facility 200 executing Docker containers 247 for implementing local power system monitoring and optimization, according to examples described herein. As provided herein, the various functions of the computer system 210 of the network-isolated facility 200 (e.g., a power generation station, nuclear facility, oil tanker, container vessel, etc.) can execute a set of packaged software containers that enable the computer system 210 to perform some or all of the functions of the battery optimization engine 130 as shown and described with respect to FIG. 1. As such, the computer system 210 can execute the Docker containers 247 compiled by way of the computing system 100 of FIG. 1 to perform the battery monitoring and optimization techniques described throughout the present disclosure.

Referring to FIG. 2, the computer system 210 can include a sensor interface 205 to receive power system data from various sensors 265 of power systems 260 of the network-isolated facility 200. As described herein, the power systems 260 can comprise batteries or battery-packs and can supply electrical power to various battery power systems 270 of the network-isolated facility 200. In certain examples, these battery-powered systems 270 can comprise any device that requires electrical power to operate, such as HVAC or climate control systems (e.g., of shipping containers), sensors, processing resources, electronic devices, and the like. The computer system 210 can include a battery optimization engine 230 (e.g., via execution of the containers 247) which can receive the power system data from the power systems 260 of the facility 200 and perform the monitoring, optimization, notification, and recommendation techniques described herein.

In various examples, the computer system 210 can further include a memory 245 storing the Docker containers 247 for execution, and power system data logs 249 for tracking the performance of the power systems 260 and providing the battery optimization engine 230 with historical information of the power systems 260 for future optimization settings. The computer system 210 can further include a display 20 for presenting notifications, warnings, recommendations, and power system information indicating the status of each power system 260 of the facility 200. The battery optimization engine 230 can transmit display data to the display 250 to present the foregoing information. Furthermore, an operator or technician can interact with the display 250 to transmit commands via the sensor interface 205 to the power systems 260 for settings adjustments or power on/off commands. Additionally or alternatively, the battery optimization engine 230 may be configured to automatically transmit a set of optimization commands to selected power systems 260 to adjust settings for optimal usage.

In certain examples, the computer system 210 can include a log manager 240, which can update the power system data logs 249 that store the various power system data for each power system 260 (e.g., using unique identifiers and timestamps as described). On occasion, the network-isolated facility 200 may encounter a reliable, high bandwidth network 280 via a network trigger (e.g., when a container vessel enters a port). In such occasions, the computer system 210 can transmit the log data from the power system logs 249 via a network interface 115 (e.g., Wi-Fi, cellular, etc.) to the computing system 100 described with respect to FIG. 1 (e.g., for redundant processing and/or immutable storage on the Blockchain).

Methodology

Figure 3:
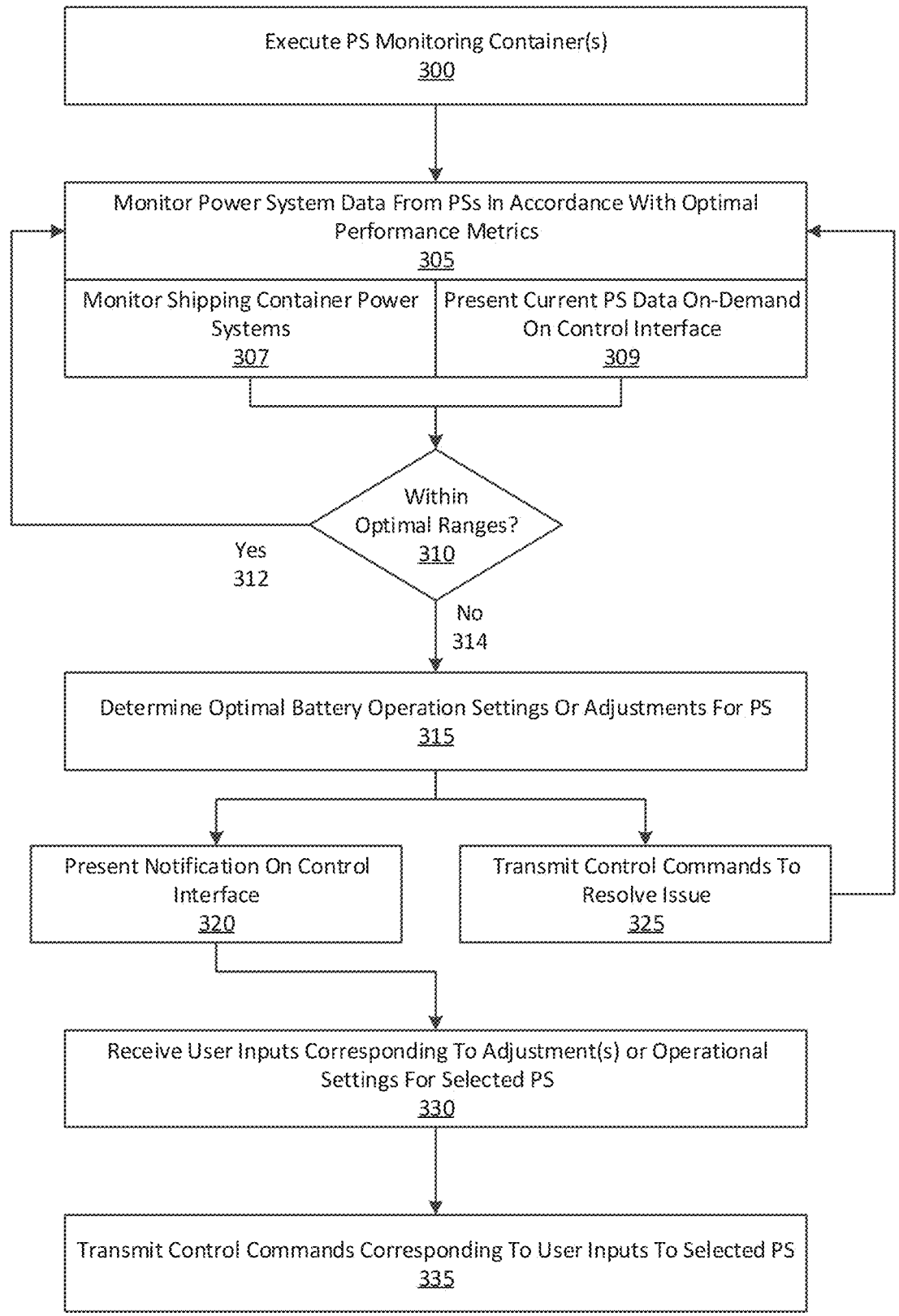
FIG. 3 is a flow chart describing an example method of local power system monitoring and optimization, according to various examples.

FIG. 3 is a flow chart describing an example method of local power system monitoring and optimization by a network-isolated facility, according to various examples. In the below description of FIG. 3, reference may be made to reference characters representing various features shown and described with respect to FIGS. 1 and 2. Furthermore, the method described with respect to FIG. 3 may be performed by an example computer system 210 of a network-isolated facility 200 as shown and described in connection with FIG. 2. Referring to FIG. 3, the computer system 210 can execute a set of power system monitoring containers that enable the computer system 210 to locally perform battery monitoring and optimization techniques described herein (300). Execution of the containers can cause the computer system 210 to monitor power system data from power systems 260 of the network-isolated facility 200 (305).

In some examples, the computer system 210 can monitor the power systems 260 of a container ship, such as those powering refrigerated or climate controlled shipping containers (307). Additionally, the computing system 210 can present current power system data on a live graphical user interface that can enable a technician to interact with the battery management systems of the power systems 260 (309). For each power system 260, the computer system 210 can determine whether the power system 260 operating within an optimal set of performance ranges (310). If so (312), the computer system 210 can continue monitoring (305). However, if the computer system 210 detects (for a current time interval) or predicts (for an imminent or future time interval) an anomaly with respect to a power system 260 (314), the computer system 210 can determine optimal battery operation settings or parameter adjustments for the power system (315). In some aspects, the computer system 210 can transmit control commands to resolve the issue to the power system 260 directly (325), and then continue to monitor (305). In variations, the computer system 210 can present a notification of the issue on a control interface 205 of the computer system 210 (320).

Figure 4:
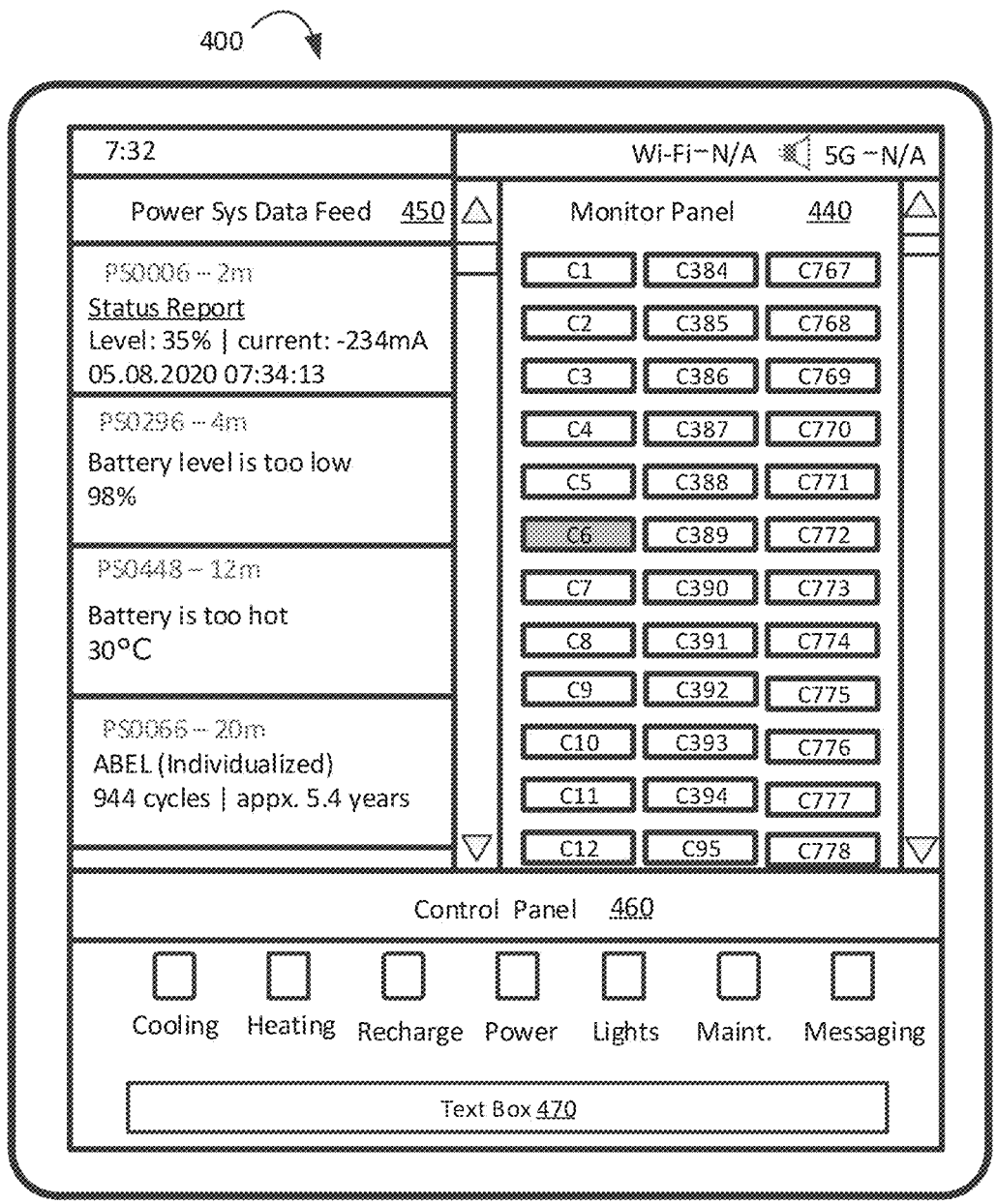
FIG. 4 illustrates an example graphical user interface providing a container ship control panel and power system data feed, according to examples described herein.

The computer system 210 can then receive user inputs corresponding to adjustments or operational settings for the power system 210 from an operator (330). Based on the user inputs, the computer system 210 can transmit the control commands to the selected power system 260 to resolve the issue (335). Accordingly, the graphical user interface presenting the power system information can enable the operator to manage and resolve power system issues Graphical User Interface Example FIG. 4 illustrates an example interactive graphical user interface 400 providing a container ship control panel and power system data feed, according to examples described herein. The interactive user interface 400 may be displayed on a display 250 of the computer system 210 as shown and described with respect to FIG. 2, or may be at least partially presented on a mobile computing device or tablet of an on-board operator. Referring to FIG. 4, the user interface 400 can be presented with a power system data feed 450 that presents updates for each power system 260 of each shipping container on-board the vessel. As shown, the updates can include status updates for individual power systems 260, warnings and/or notifications, recommendations, ABEL reports, RUL reports, and the like.

In certain implementations, the user interface 400 can include functionality to enable the operator to select any particular power system 260 on a monitor panel 440 to view its current status (e.g., charge, temperature, etc.), ambient conditions, ABEL, RUL, and the like. As shown in FIG. 4, the operator has selected C6, which can correspond to a power system 260 providing power to a climate control system of a specified shipping container. The data feed 450 can present the status report for C6 in response. In variations, when a particular power system 260 operates outside a set of optimal performance ranges, the user interface 400 can automatically highlight the power system 260 on the monitor panel 440 and present the issue and/or a resolution action to be taken.

In certain aspects, the user interface 400 can further include a control panel 460 and text box 470 that enables the operator to select any number of actions to be performed in relation to a selected power system 260. Such action can include, among others, adjusting the cooling or heating of the shipping container, recharge commands to recharge a battery pack, turning the power on or off, providing lighting, maintenance requests, and messaging (e.g., to a maintenance crew). Upon selection of any particular action, the user inputs provided on the user interface 400 can cause the computer system 210 to transmit control commands to the selected power system 260 accordingly, or can transmit requests and/or messages to selected individuals on-board the vessel. In various examples, the computer system 210 can present the settings recommendations for a particular power system 260, and the operator may simply select the recommendation to enable the computer system 210 to transmit control commands corresponding to the recommendation to the selected power system 260.

Hardware Diagram

Figure 5:
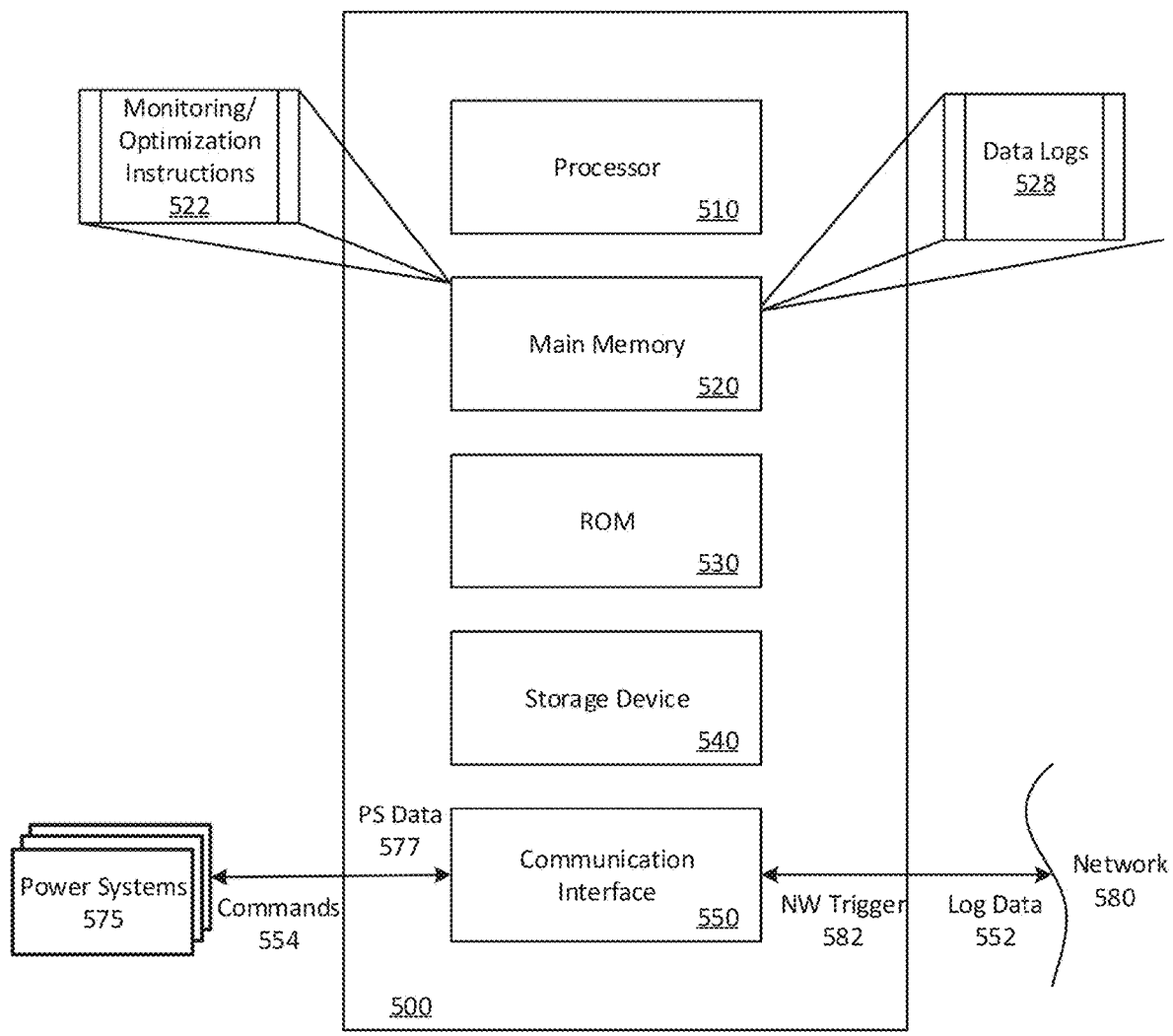
FIG. 5 is a block diagram that illustrates a computer system upon which examples described herein may be implemented.

FIG. 5 is a block diagram that illustrates a computer system upon which examples described herein may be implemented. A computer system 500 can be implemented on, for example, a server or combination of servers, virtual machine, cloud server(s), cloud environment or platforms. For example, the computer system 500 may be implemented as part of a network service, such as described in FIGS. 1 through 4, and/or as a node in a distributed system of nodes (e.g., a distributed ledger 185). In the context of FIG. 1 or 2, the computing system 100 or 210 or a network-isolated system 175 may be implemented using a computer system 500 such as described in connection with FIG. 5. The computing system 100 or 210 or a network-isolated system 175 may also be implemented using a combination of multiple computer systems 500 as described in connection with FIG. 5. The network-isolated system 175 may perform one or more of the processes described herein, and may include one or more of the processing resources 510, main memory 520, read-only memory (ROM) 530, storage device 540, or communication interface 550 shown in FIG. 5.

In one implementation, the computer system 500 includes processing resources 510, a main memory 520, a read-only memory (ROM) 530, a storage device 540, and a communication interface 550. The computer system 500 includes at least one processor 510 for processing information stored in the main memory 520, such as provided by a random-access memory (RAM) or other dynamic storage device, for storing information and instructions which are executable by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions.

The communication interface 550 enables the computer system 500 to communicate with one or more networks 580 (e.g., cellular network) through use of the network link (wireless or wired). Using the network link, the computer system 500 can communicate with one or more computing devices, one or more servers, or one or more databases. In some aspects, the computer system 500 can receive a network trigger 582 indicating network access to the network 580 to, for example, transmit the log data 552 stored in data logs 528 to the computing system 100 described with respect to FIG. 1.

The executable instructions stored in the memory can include monitoring and optimization instructions 522, which as described herein, can be containerized to operate using a single operating system kernel. the processing resources 610 can execute the instructions 522 to perform the power system monitoring and optimization techniques described throughout the present disclosure, and store power system information in the data logs 528. Execution of the instructions 522 can cause the computer system 600 to receive power system data 577 from the power systems 575 of the network-isolated facility and enable an operator to provide control commands 554 to adjust one or more settings or parameters of selected power systems 575.

Examples described herein are related to the use of the computer system 500 for implementing the techniques described herein. According to one example, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A computer system of a network-isolated facility, the computer system comprising:
   communication interface communicating with a plurality of power systems of the network-isolated facility;
   one or more processors; and
   one or more memory resources storing a set of software containers that, when executed by the one or more processors, cause the computer system to perform operations comprising:
      receiving, via the communication interface, power system data from each individual power system of the plurality of power systems;
      monitor the power system data for each individual power system in accordance with a set of performance ranges for the individual power system;
      generating an interactive graphical user interface presenting status updates for each of the plurality of power systems;
      based on monitoring the power system data, making a determination that a selected power system from the plurality of power systems is operating outside the set of performance ranges for the selected power system; and
      in response to making the determination, presenting, on the interactive graphical user interface, a notification enabling the operator to perform a resolution action for the selected power system via the interactive graphical user interface.

2. The computer system of claim 1, wherein the executed set of software containers cause the computer system to perform further operations comprising:
   receiving, via the communication interface, telemetric data from one or more sensors of the selected power system;
   wherein the executed set of software containers cause the computer system to make the determination that the selected power system is operating outside the set of performance ranges of the selected power system based on the power system data and the telemetric data.

3. The computer system of claim 2, wherein the telemetric data comprises at least one of: inertial measurement unit (IMU) data), temperature data, pressure data, or image data.

4. The computer system of claim 1, wherein the executed set of software containers causes the computer system to further determine that the selected power system operates outside the set of performance ranges based on one or more of: a producer of the selected power system, a type of battery cell chemistry of the selected power system, a current time, optimal charging and discharging temperatures, a stated or estimated calendar life of one or more batteries, current estimated cycles, current c-rate, cell voltage, energy density, or depth of discharge of the selected power system.

5. The computer system of claim 1, wherein the executed set of set of software containers cause the computer system to present the set of interactive graphic features to include a set of recommendations for the operator for performing the resolution action for the selected power system.

6. The computer system of claim 5, wherein the set of recommendations are based on data provided from at least one of a producer or integrator that developed and/or tested the selected power system.

7. The computer system of claim 6, wherein the data provided from the at least one of the producer or integrator of the selected power system comprise at least one of: nominal capacity of a power cell solution of the selected power system, usable capacity of the power cell solution, or setup information of a battery management system of the selected power system.

8. The computer system of claim 1, wherein monitoring the power system data of the plurality of power systems comprises monitoring at least one of atomic or aggregated data from a battery management system of the selected power system.

9. The computer system of claim 8, wherein the at least one of the atomic or aggregated data from the battery management system of the selected power system comprise one or more current limits, a current reading from a direct current bus, stack voltage of individual cells of the selected power management system, cell voltage statistics, cell voltage locations within the selected power system, temperature statistics, temperature measurement locations, contactor states of the selected power system.

10. The computer system of claim 1, wherein the executed set of software containers further causes the computer system to:
based on the power system data, periodically calculate an approximate battery end of life (ABEL) for each of the plurality of power systems;
detect a network access signal enabling network communication over one or more external networks; and
in response to detecting the network access signal, transmit, over the one or more external networks, ABEL information for each of the plurality of power systems to a backend computing system that certifies immutable ABEL reports for each of the plurality of power systems.

11. A computer-implemented method of monitoring a network-isolated facility, the method being performed by one or more processors and comprising:
communicating with a plurality of power systems of the network-isolated facility;
receiving, via a communication interface, power system data from each individual power system of the plurality of power systems;
monitor the power system data for each individual power system in accordance with a set of performance ranges for the individual power system;
generating an interactive graphical user interface presenting status updates for each of the plurality of power systems;
based on monitoring the power system data, making a determination that a selected power system from the plurality of power systems is operating outside the set of performance ranges for the selected power system; and
in response to making the determination, presenting, on the interactive graphical user interface, a notification enabling the operator to perform a resolution action for the selected power system via the interactive graphical user interface.

12. The method of claim 11, further comprising:
receiving, via the communication interface, telemetric data from one or more sensors of the selected power system;
wherein the one or more processors make the determination that the selected power system is operating outside the set of performance ranges of the selected power system based on the power system data and the telemetric data.

13. The method of claim 12, wherein the telemetric data comprises at least one of: inertial measurement unit (IMU) data), temperature data, pressure data, or image data.

14. The method of claim 11, wherein the executed set of software containers causes the computer system to further determine that the selected power system operates outside the set of performance ranges based on one or more of: a producer of the selected power system, a type of battery cell chemistry of the selected power system, a current time, optimal charging and discharging temperatures, a stated or estimated calendar life of one or more batteries, current estimated cycles, current c-rate, cell voltage, energy density, or depth of discharge of the selected power system.

15. The method of claim 11, wherein the one or more processors present the set of interactive graphic features to include a set of recommendations for the operator for performing the resolution action for the selected power system.

16. The method of claim 15, wherein the set of recommendations are based on data provided from at least one of a producer or integrator that developed and/or tested the selected power system.

17. The method of claim 16, wherein the data provided from the at least one of the producer or integrator of the selected power system comprise at least one of: nominal capacity of a power cell solution of the selected power system, usable capacity of the power cell solution, or setup information of a battery management system of the selected power system.

18. The method of claim 11, wherein monitoring the power system data of the plurality of power systems comprises monitoring at least one of atomic or aggregated data from a battery management system of the selected power system.

19. The method of claim 18, wherein the at least one of the atomic or aggregated data from the battery management system of the selected power system comprise one or more current limits, a current reading from a direct current bus, stack voltage of individual cells of the selected power management system, cell voltage statistics, cell voltage locations within the selected power system, temperature statistics, temperature measurement locations, contactor states of the selected power system.

20. A non-transitory computer-readable medium storing instructions that, when executed by one or more processors, cause the one or more processors to perform operations comprising:
communicating with a plurality of power systems of the network-isolated facility;
receiving, via a communication interface, power system data from each individual power system of the plurality of power systems;
monitor the power system data for each individual power system in accordance with a set of performance ranges for the individual power system;
generating an interactive graphical user interface presenting status updates for each of the plurality of power systems;
based on monitoring the power system data, making a determination that a selected power system from the plurality of power systems is operating outside the set of performance ranges for the selected power system; and
in response to making the determination, presenting, on the interactive graphical user interface, a notification enabling the operator to perform a resolution action for the selected power system via the interactive graphical user interface.

* * * * *